United States Patent [19]

Bond et al.

[11] Patent Number: 5,495,497
[45] Date of Patent: Feb. 27, 1996

[54] METHOD AND APPARATUS FOR SUPPRESSING INTERFERENCE FROM BANDSPREAD COMMUNICATION SIGNALS

[75] Inventors: James W. Bond; Thomas Schlosser, both of San Diego, Calif.; William Velez, Tuscon, Ariz.

[73] Assignee: The United States of America as represented by the Secretary of the Navy, Washington, D.C.

[21] Appl. No.: 766,618

[22] Filed: Sep. 25, 1991

[51] Int. Cl.$^6$ .................................................... H04B 1/69
[52] U.S. Cl. ......................................... 375/200; 375/208
[58] Field of Search ...................................... 375/1; 380/34

[56] References Cited

U.S. PATENT DOCUMENTS

| | | |
|---|---|---|
| 3,972,000 | 7/1976 | Desblache et al. |
| 4,630,283 | 12/1986 | Schiff .......................................... 375/1 |
| 4,649,505 | 3/1987 | Zinser, Jr. et al. |
| 4,706,263 | 11/1987 | von der Embse. |
| 4,774,715 | 9/1988 | Messenger ................................. 375/1 |
| 4,811,363 | 5/1989 | Hoffmann. |
| 4,843,616 | 7/1989 | Hoffmann. |
| 4,922,506 | 5/1990 | McCallister et al. ..................... 375/1 |
| 4,953,184 | 8/1990 | Simone. |
| 5,103,460 | 4/1992 | Stewart et al. ............................ 375/1 |

Primary Examiner—Salvatore Cangialosi
Attorney, Agent, or Firm—Harvey Fendelman; Thomas Glenn Keough

[57] ABSTRACT

A method and apparatus are provided for suppressing interference from a sequence of bandspread communication signals received by a radio receiver. Each sample is defined as a vector having signal and interference vector components. The interference vector component is such that: 1) the interference dominates the signal vector component, and 2) the phase of the interference vector components in the sequence changes slowly with time. Interference is suppressed while a portion of the signal vector component that is normal to the interference vector component is estimated as an indication of the bandspread communication signal. To do this, a phase angle is determined for each sample based upon each sample's defined vector. The phase angle for each sample is transformed into a corresponding phase vector based on a symmetric sampling of phase angles from previous and subsequent received signal samples. All terms of each corresponding phase vector are summed and averaged to generate a corresponding average phase gain for each sample. Each corresponding average phase gain is multiplied by a vector normal to the corresponding sample's defined vector to estimate the signal vector that is normal to the interference vector for each sample. The method and apparatus are effective whenever the phase of the interference vector components is characterized as having a frequency of change that is less than ½T, where T is the time required to receive the symmetric sampling.

12 Claims, 4 Drawing Sheets

METHOD AND APPARATUS FOR SUPPRESSING INTERFERENCE FROM BANDSPREAD COMMUNICATION SIGNALS

STATEMENT OF GOVERNMENT INTEREST

The invention described herein may be manufactured and used by or for the Government of the United States for governmental purposes without the payment of any royalties thereon or therefor.

FIELD OF THE INVENTION

The present invention relates to the field of radio frequency interference suppression and more particularly to a method and apparatus for suppressing interference from bandspread communication signals.

BACKGROUND OF THE INVENTION

Since narrow frequency band communication signals are easily detected, jammed, etc., military communication systems utilize bandspread communication signals. However, in a military theater of operation, unfriendly forces intentionally interject non-Gaussian interference into the radio transmission spectrum which can interfere with the reception of even bandspread signals. Additionally, such "intentional" interference generally dominates the transmission signal as well as any Gaussian noise associated therewith.

Prior art interference suppression systems have typically applied adaptive filtering techniques to suppress interference from bandspread communication signals. One of the most effective techniques to date uses an adaptive Wiener filter to estimate the phase properties of the interference. See, for example, "Adaptive Signal Processing" by Widrow and Stearns, Prentice Hall, 1985. While this approach is straightforward, the calculations required are tedious and can become quite complex. Furthermore, Wiener filters are also susceptible to non-relevant broadband noise because their phase properties cannot be predicted.

Thus, a need exists for a simple and effective method of suppressing interference from bandspread communication signals. Accordingly, an object of the present invention is to provide a method and apparatus for suppressing interference from bandspread communication signals whenever the interference dominates the signal being received. Another object of the present invention is to provide a method and apparatus for suppressing interference from bandspread communication signals that is easily adapted to existing radio receivers. Still another object of the present invention is to provide a method and apparatus for suppressing interference from bandspread communication signals that is less affected by non-relevant broadband noise than adaptive Wiener filters.

SUMMARY OF THE INVENTION

A sequence of bandspread communication signal samples are generated by a radio receiver from the received communication signal. Each sample is defined as a vector having a signal vector component and an interference vector component. The interference vector component is such that it dominates the signal vector component. A method and apparatus are provided for suppressing the interference vector component by estimating a portion of the signal vector component that is normal to the interference vector component as an indication of the bandspread communication signal. A phase angle is determined for each sample based upon each sample's defined vector. The phase angle for each sample is then transformed into a corresponding phase vector based on a symmetric sampling of phase angles from previous and subsequent received signal samples. All terms of each corresponding phase vector are then summed to generate a corresponding phase gain for each sample. Each corresponding phase gain is averaged over the symmetric sampling to generate a corresponding average phase gain for each sample. Each corresponding average phase gain is multiplied by a vector normal to the corresponding sample's defined vector to estimate the signal vector component that is normal to the interference vector component for each sample. The method and apparatus are effective whenever the phase of the interference vector component is characterized as having a frequency of change that is less than ½T, where T is the time required to receive the symmetric sampling.

DESCRIPTION OF THE PREFERRED EMBODIMENT

Figure 1:
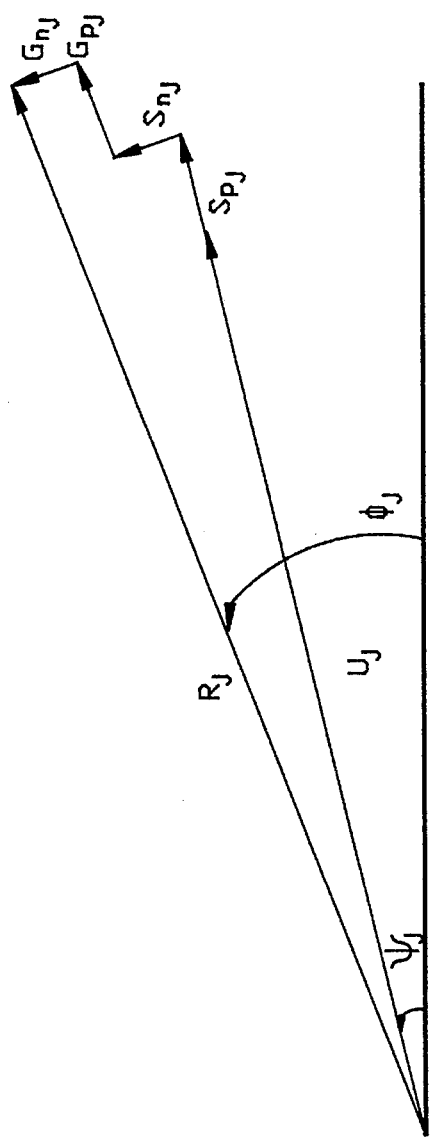
FIG. 1 is a vector diagram showing the relationships between the received signal and the interference, communication signal and noise signal components thereof.

Referring now to the drawings, and in particular to FIG. 1, a vector diagram will be used to explain the approach of the present invention. The baseband expression of a received (communication) signal vector $R_j$ (boldface type denotes vector quantity) is assumed to have the following form:

$$R_j = U_j + S_j + G_j \tag{1}$$

where $U_j$ denotes the interference component vector, $S_j$ the communication signal component vector and $G_j$ the Gaussian noise component vector of the received signal sample. The components of $R_j$, $U_j$, $S_j$ and $G_j$, are pairs of real numbers where each pair consists of an inphase and quadrature component. Vectors $S_j$ and $G_j$ can be further decomposed into two pairs of vectors $S_{pj}$ and $G_{pj}$ parallel to $U_j$ and $S_{nj}$ and $G_{nj}$ normal to $U_j$. It is the determination of the normal vector $S_{nj}$ that serves as an indication of the desired communication signal.

The lengths of $S_{nj}$ and $G_{nj}$ will be denoted $s_j$ and $g_j$, respectively, where a positive value indicates that the respective vector points upward from $U_j$ and a negative value indicates that the respective vector points downward from $U_j$. Keeping in mind that the interference component $U_j$ is much greater in magnitude than the maximum of either $S_1 j$ or $G_j$ the following approximation can be made $$\phi_j \approx \psi_j + \frac{s_j}{A_j} + \frac{g_j}{A_j} \quad (2)$$

where $\phi_j$ is the phase of the received signal sample $R_j$, $\psi_j$ is the phase of the interference component $U_j$, and $A_j$ is the magnitude of the received signal sample $R_j$. Recalling that $R_j$ can also be defined by an inphase/quadrature pair $(x_j, y_j)$, $A_j$ is defined as $$A_j = \sqrt{x_j^2 + y_j^2} \quad (3)$$

In many cases, the phase $\psi_j$ associated with the interference component $U_j$ changes slowly with time. Further, since the interference component $U_j$ dominates the received signal $R_j$, the phase $\phi_j$ of $R_j$ can also be considered to change slowly with time. With this is mind, the interference could be suppressed by generating a sum of phase differences over time to cancel the phase $\psi_j$ associated with the interference component for each j-th sample. Cancellation of $\psi_j$ allows for estimates of $s_j$ and $g_j$ according to equation (2). Ideally, the sum of phase differences would be generated by taking a symmetric sampling about the j-th sample and then averaging the sum over the size of the symmetric sampling. Thus, equation (2) would be rewritten $$\frac{1}{2n} \sum_{i=j-n}^{j+n} (\phi_j - \phi_i) = \frac{1}{2n} \sum_{i=j-n}^{j+n} (\psi_j - \psi_i) + \quad (4)$$

$$\frac{s_j}{A_j} - \frac{1}{2n} \sum_{i=j-n, i \neq j}^{j+n} \frac{s_j}{A_j} + \frac{g_j}{A_j} - \frac{1}{2n} \sum_{i=j-n, i \neq j}^{j+n} \frac{g_j}{A_j}$$

where n is the sampling rate chosen. The value of n is chosen to be an integer power of 2 in order to simplify the summing network used. Note that each summation term is averaged for each j-th sample over the symmetric sampling. Depending on the radio receiver, its frequency of operation, and the nature of the interference, allowable values of n starting with 2 may be experimented with until satisfactory signal reception is achieved. For example, for a radio receiver operating in the very low frequency (VLF) band (10 to 30 KHz), it was found that n=4 or 8 provided satisfactory performance.

Referring still to equation (4), note that the terms $s_j/A_j$ and $g_j/A_j$ represent the communication signal and broadband noise components, respectively, for sample j. These terms can be easily determined by the radio receiver's demodulator providing the remaining terms of the equation are small. The summation of $s_i/A_i$ and $g_i/A_i$, i=j−n to j+n, are expected to be much smaller than $s_j$ and $g_j$, respectively, because these are summations involving terms which are equally likely to be positive or negative. The term $$\frac{1}{2n} \sum_{i=j-n}^{j+n} (\psi_j - \psi_i) \quad (5)$$

is small when the interference changes slowly with time. This is easily observed by rewriting the term as $$\frac{1}{2n} \sum_{i=j-n}^{j+n} (\psi_j - \psi_i) = \sum_{i=1}^{n} (2\psi_j - \psi_{j+i} - \psi_{j-i}) \quad (6)$$

where the term $2\psi_j - \psi_{j+i} - \psi_{j-i}$ is zero for linearly changing phase and approximately zero for slowly changing phase. In this way, the information contained in the sum of phase differences for each j-th sample is information on the communication signal component $S_j$.

The above described method is effective for suppressing signal dominating interference with slowly changing phase from bandspread signals having information bits spread by a factor of at least 10 chips. Note that even this modest amount of bandspreading provides sufficient processing gain to extract $S_j$ from the combination $s_j + g_j$.

Figure 2:
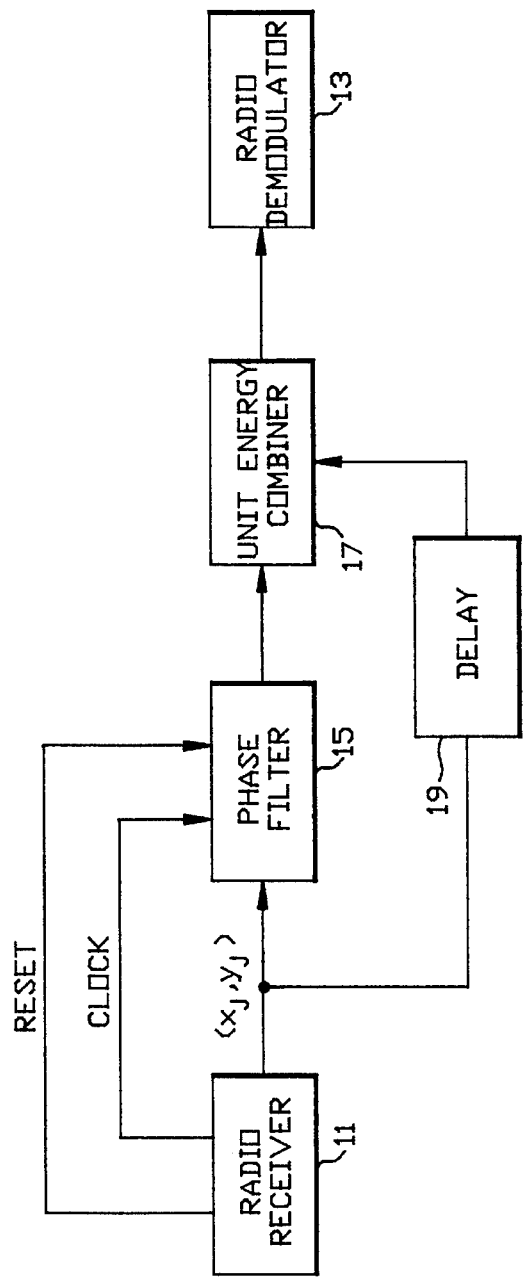
FIG. 2 is a block diagram of the basic hardware elements of the present invention as they would be installed in a radio receiver.

The apparatus for implementing the above described method will now be explained with reference to FIGS. 2 through 7. In FIG. 2, a typical military radio consists of a radio receiver 11 and radio demodulator 13. A phase filter 15 and unit energy combiner 17 are connected between receiver 11 and demodulator 13 to implement the method of the present invention. A second input to combiner 17, provided from the output of receiver 11, is appropriately delayed by a delay 19 for reasons to be explained further hereinbelow. Finally, Reset and Clock signals from receiver 11 are input to phase filter 15 in order to synchronize same with receiver 11 and demodulator 13.

Figure 3:
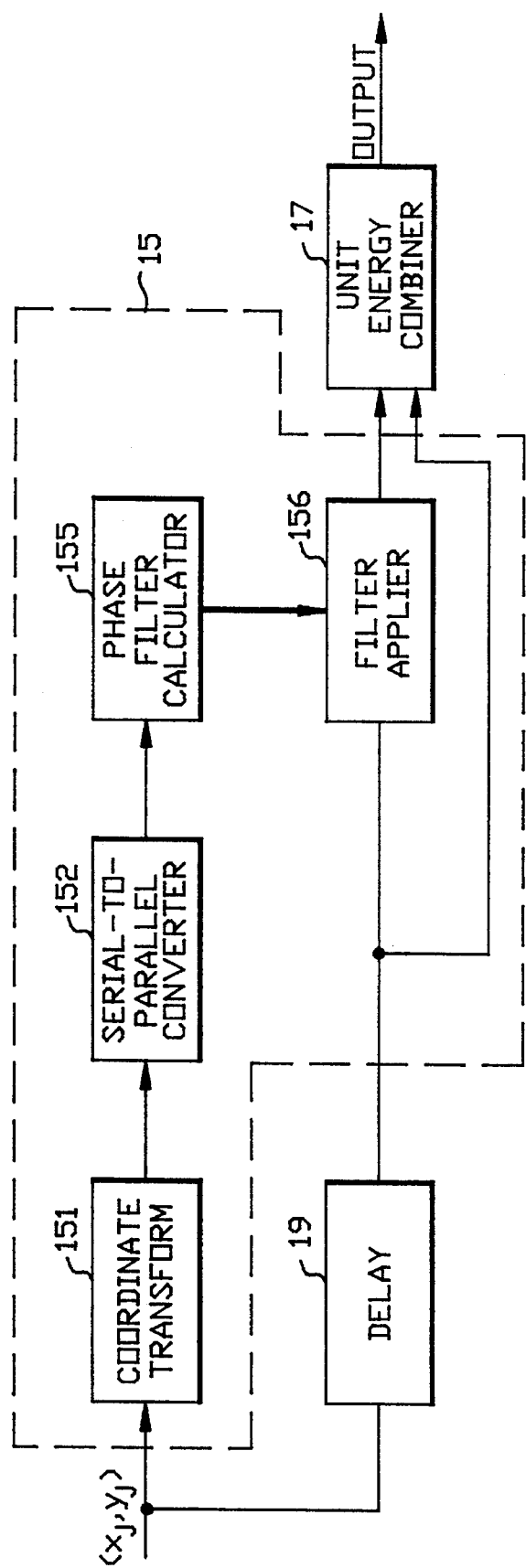
FIG. 3 is a detail block diagram showing the major components of the phase filter of FIG. 2.
Figure 4:
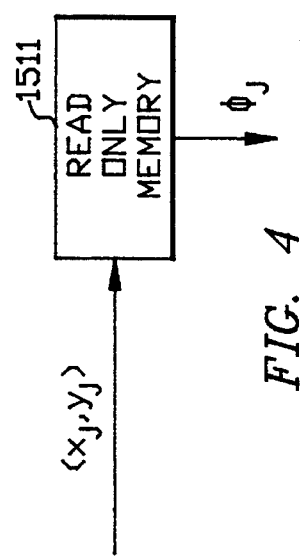
FIG. 4 is a detail block diagram of the coordinate transformer of FIG. 3.

In FIG. 3, a block diagram shows the major components of phase filter 15. A coordinate transform 151 is provided to determine the phase $\phi_j$ of each received signal input pair $(x_j, y_j)$ from a received sequence of bandspread signals. In one embodiment, the components of the input pair $(x_j, y_j)$ are concatenated to address a read only memory (ROM) 1511, shown in FIG. 4, which stores the values of the phase assigned to the pair $(x_j, y_j)$. The assignment is based as follows:

1) if $x_j=0$, the $\phi_j=0$;
2) if $x_j>0$, then $\phi_j$ arctan $(y_j/x_j)$; and
3) if $x_j<0$, then $\phi_j=$arctan $(y_j/x_j)+[\text{sign}(y_j)]\pi$, where sign$(y_j)=1$ if $y_j>0$ and $-1$ if $y_j<0$.

The phase values stored in ROM 1511 are expressed in radians and take on values between $-\pi$ and $+\pi$. Alternatively, coordinate transform 151 could calculate $\phi_j$ for each input pair $(x_j, y_j)$.

A serial-to-parallel converter 152 is provided to convert each one of the sequence of phase samples $\phi_j$ into a vector of sample phase differences $$(\phi_j - \phi_{j-n}, \ldots, \phi_j 31 \phi_{j-1}, \phi_j - \phi_{j+1}, \ldots, \phi_j - \phi_{j+n})$$

where n is the aforementioned sampling rate. As is readily apparent, each j-th vector has 2n terms and is formed by subtracting n consecutive previous sample phases and n consecutive subsequent sample phases from j-th sample phase. Each phase difference term in the vector is further reduced to a value between $+\pi$ and $-\pi$.

Figure 5:
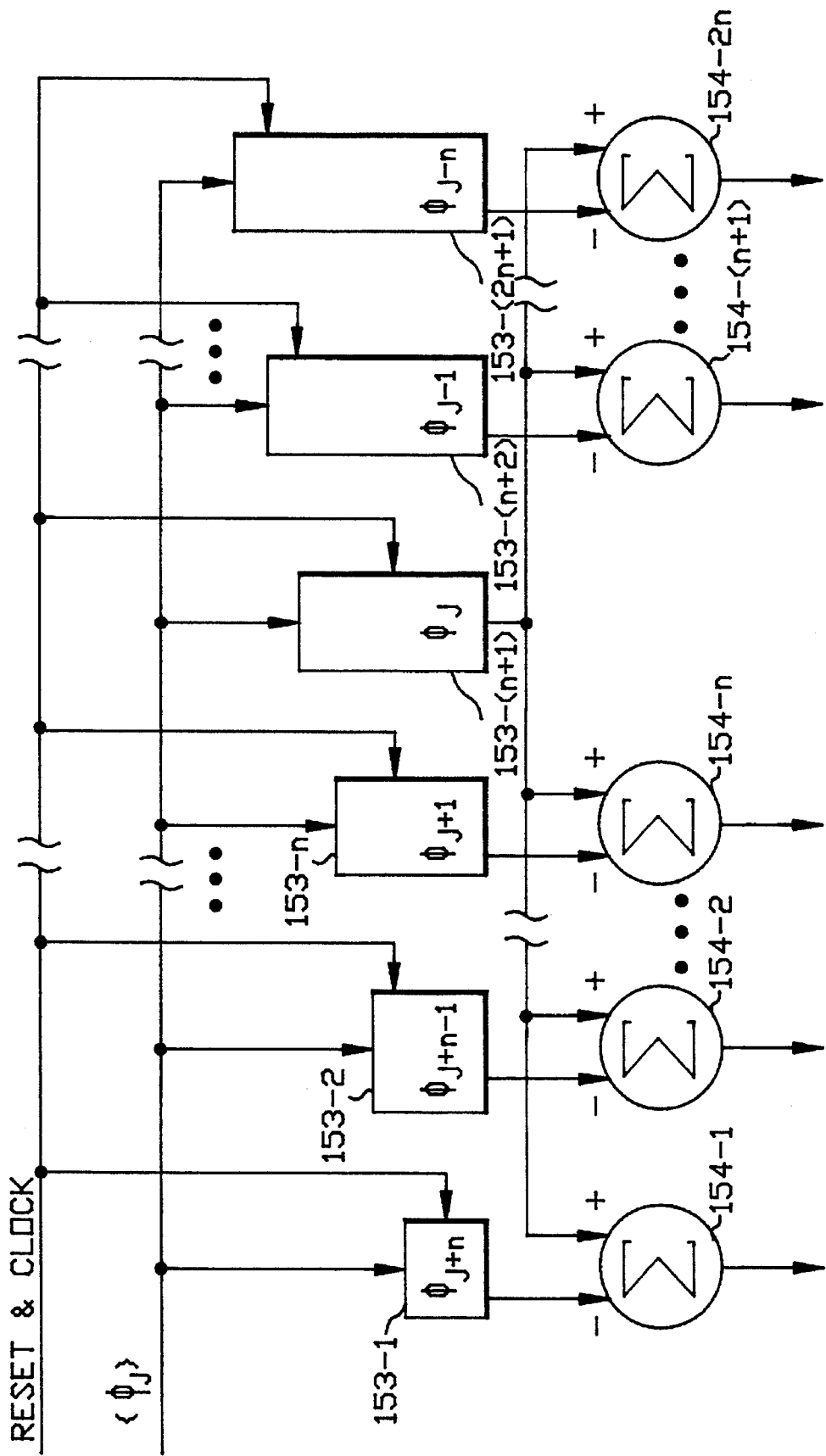
FIG. 5 is a detail schematic diagram of the serial-to-parallel converter of FIG. 3.
Figure 6:
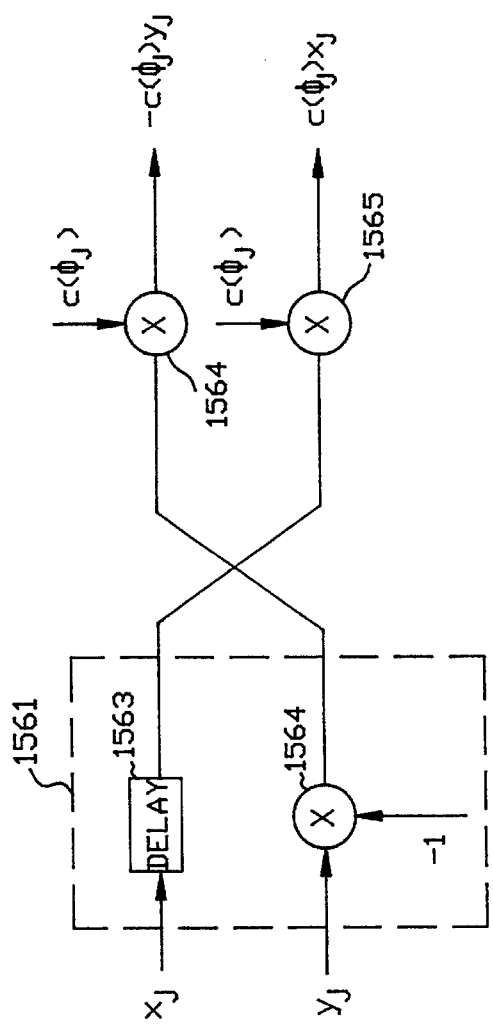
FIG. 6 is a detail schematic diagram of the filter applier of FIG. 3.

The structure of a preferred embodiment serial-to-parallel converter 152 is shown in greater detail in FIG. 5. In FIG. 5, a sequence of (2n+1) shift registers 153-1 through 153-(2n+1) have corresponding lengths of 1 to 2n+1. The Reset and Clock signals from radio receiver 11 are applied to each shift register for synchronization with receiver 11. The outputs of each shift register, except that of register 153-(n+1), are fed to a sequence of 2n adders 154-1 though 154-2n connected in parallel as shown, to generate the vector of sample phase differences.

As mentioned above, each sample phase difference term in the generated vector is reduced to a value between $+\pi$ and $-90$. A simple way of achieving such a reduction is to use shift registers 18 without overflow protection. Neglecting the (N+1)-th bit of a shift register is equivalent, due to the choice of representation of $\pi$, to subtracting or adding $2\pi$ to force each sample phase difference term $\phi_j - \phi_i$ to fall between $-\pi$ and $+\pi$. Alternatively, the sample phase difference terms $\phi_j - \phi_i$ could be forced to continually change without transition between $-\pi$ and $+\pi$. In this way, the phase filter 15 could cope with the phase of the interference changing during the elapsed time between sample $\phi_{j-n}$ and sample $\phi_{j+n}$. In such a case, the criteria used for increasing or decreasing the phase of the next sample $\phi_{i+1}$, i=j−n to j+n, is as follows:

1) if $|\phi_i - \phi_{i-1}| \leq \pi$, leave the phase unchanged; or 2) if $|\phi_i-\phi_{i+1}|>\pi$, add/subtract $2\pi$ to satisfy condition 1) above.

In addition, if the phase is allowed to continually change, it is necessary to change the values of all the phases between $\phi_{i-(2n+1)}$ and $\phi_i$ periodically in order to prevent the phase from growing too large or too small over time. Specifically, 1) whenever $\phi_{i-(2n+1)}<-k\pi$, $2k\pi$ is added to all of the phase samples between $\phi_{i-(2n+1)}$ and $\phi_i$; and
2) whenever $\phi_{i-(2n+1)}>k\pi$, $2k\pi$ is subtracted from all of the sample phases between $\phi_{i-(2n+1)}$ and $\phi_i$, where k is an integer between 1 and 20 and is preferably set at 10. One method of achieving this is to calculate the phase difference between present and previous samples and adding the difference to the phase of the previous sample. This newly calculated variable is allowed to take on a value between $-k\pi$ and $+k\pi$. Naturally, any phase change must be carried through for all the shift registers 153-1 through 153-(2n+1) in order to prevent discontinuity in the overall calculation. Accordingly, the plurality of shift registers could be replaced by a single, serial-in-parallel-out shift register in order to assure an "across the board" update. In addition, delay 19 must be adjusted to account for this additional processing time.

Referring again to FIG. 3, a phase filter calculator 155 uses any conventional summing network (not shown) to form the averaged sum term $$\frac{1}{2n} \sum_{i=j-n}^{j+n} (\phi_j - \phi_i) \quad (7)$$

for each j-th vector of sample phase differences. The choice of summing network is not a constraint on the present invention. As mentioned above, selecting n to be a power of 2 simplifies the design of the summing network. For ease of description, the averaged sum term in equation (7) will hereinafter be referred to as a composite gain factor $c(\phi_j)$.

A filter applier 156 receives the composite gain factor $c(\phi_j)$ for each j-th sample as well as the delayed input pair $(x_j,y_j)$. Note that delay 19 is chosen to appropriately delay input pair $(x_j,y_j)$ for synchronization according to the choice of sampling rate n used in determining the averaged sum term. Filter applier 156, shown in greater detail in FIG. 6, consists essentially of a rotator 1561 and two multipliers 1564 and 1565. Rotator 1561 includes a multiplier 1562 for multiplying the $y_j$ component by $-1$, and a delay 1563 to compensate for the time required to multiply $y_j$ times $-1$. Multiplier 1564 multiplies the composite gain factor $c(\phi_j)$ from filter calculator 155 times $-y_j$ while multiplier 1565 multiplies $c(\phi_j)$ times $x_j$. Note that the output vector represented by the transformed pair $(-c(\phi_j)y_j, c(\phi_j)x_j)$ is a vector normal to (i.e., rotated by $-\pi/2$) the vector represented by the input pair $(x_j,y_j)$.

Figure 7:
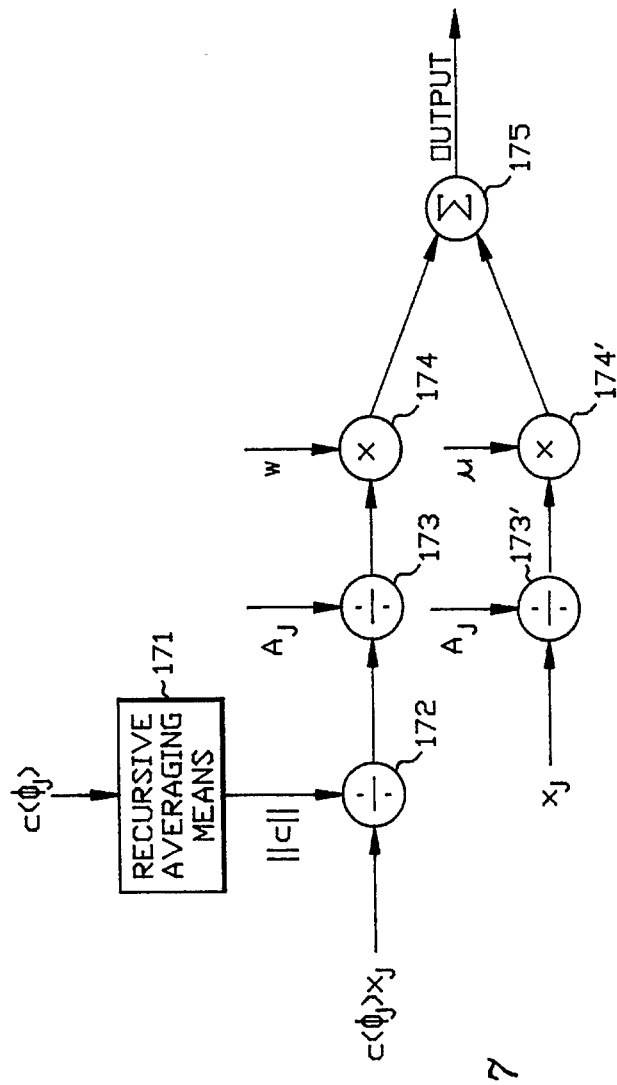
FIG. 7 is a detail schematic diagram of the unit energy combiner of FIG. 3.

The resulting output is combined with the j-th input pair $(x_j,y_j)$ by unit energy combiner 17. The input pair $(x_j,y_j)$ is appropriately delayed by delay 19 to be in sync with the output of filter applier 156 and is fed to unit energy combiner 17 via a bleed-through path 158. (Note that bleed-through path 158 is also used to bypass the invention when there is no interference present.) Since the unit energy combiner 17 is prior art, its function will only be described with respect to the $x_j$ component. It is to be understood that similar processing occurs for the $y_j$ component. As shown in FIG. 7, the magnitude of the composite signal gain factors are averaged over a plurality of signal samples (typically 15 or more samples) by conventional recursive averaging means 171 to form an average gain factor $\|c\|$. Thus, the average gain factor $\|c\|$ is continuously updated and serves as the denominator for divider 172. The transformed input pair component $c(\phi_j)x_j$ is used as the numerator for divider 172. Both the input pair component $x_j$ and the output of divider 172 are ratioed with the sample magnitude $A_j$ at dividers 173 and 173'. The output of these dividers are multiplied by weights w and u at multipliers 174 and 174', respectively The weight adjusted components are then added at adder 175 and output to radio demodulator 13 which makes the signal usable to the listener. In this way, the best representation of the communication signal is achieved from either the phase filter path or bleed-through path.

The weights u and w are constants set by the user. They are selected so that the bleed-through path 158 provides sufficient gain for the cases in which a communications signal is equal to or stronger than present interfering signals. Optimal values can be found through experimentation. For example, in VLF applications, the values of u=1 and w=4 have provided good results.

The advantages of the present invention are numerous. The present invention is a non-adaptive interference suppression method, and apparatus for implementing same, which can be used to suppress interference from bandspread communication signals. The present invention detects the transmitted communication signal in the presence of strong levels of non-Gaussian interference by exploiting the fact that the phase of the interference changes slowly with time. Thus, the present invention need not estimate the phase of the interference as done by adaptive Wiener filters. This results in a simpler filter design that is less affected by non-relevant broadband noise than the Wiener filters.

While the present invention has been described relative to specific embodiments, it is not so limited. For example, rather than fixing the sampling rate at n, let m be such that $n=2^m$ is the smallest number of samples which can be used. Then let M be some fixed integer (determined by the processing capabilities of the hardware) such that $2^M$ is the maximum number of samples. The actual number of samples n used could be dynamically changed within the bounds $2^M+1$ and $2^m+1$. The delay through the processor could be fixed at $2^{M-1}$. The criteria for the number of samples used to estimate the transformation of $\phi_j$ is that the phases $\phi_{j-2}^{m-1}, \ldots, \phi_{j+2}^{m-1}$ satisfy $|\phi_i 31 \phi_{i+1}|\leq\pi$ for any two phases in the sequence.

Another alternative of the present invention would be to process $A_j\phi_j$ rather than just $\phi_j$, where $A_j$ is the magnitude of the received signal sample $R_j$. In this case, the gain factor $c(\phi_j)$ becomes $$c(A_j,\phi_j) = \sum_{i=j-n}^{j+n} (A_j\phi_j - A_i\phi_i) \quad (8)$$

and the vector normal to the vector represented by the input pair $(x_j,y_j)$ becomes $(-y_j/A_j, x_j/A_j)$. Thus, the output of filter applier 156 becomes $$c(A_j,\phi_j)(-y_j/A_j, x_j/A_j) \quad (9)$$

This alternative approach is designed to work when the amplitude of the interference is slowly varying from a large value to small value. The normalization with respect to the amplitude scales the phase so that the signal and noise projections have the same units as amplitude. In particular, equation (2) can be rewritten as $$A_j\phi_j=A_j\psi_j+s_j+g_j \quad (10)$$

where the term $A_j\psi_j$ is attenuated through forming the sum in equation (8).

Implementation of this alternative approach is achieved by having the coordinate transform 151 output $A_j$ in addition to $\phi_j$, where $$A_j = \sqrt{x_j^2 + y_j^2} \quad (11)$$

The terms $A_j \phi_j$ are then fed to the serial-to-parallel converter 152 while $A_j$ is fed to filter applier 156 where it is inverted and used to generate the pair $(-y_j/A_j, x_j/A_j)$. Note that $A_j$ must be appropriately delayed prior to being input to filter applier 156 in order to maintain synchronization.

Thus, although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A method of suppressing interference from a sequence of bandspread communication signal samples in order to estimate a communication signal contained therein wherein the signal samples have information bits that are spread by a factor of ten or more, and wherein each j-th sample is defined by an input pair $(x_j, y_j)$ comprising the steps of:

generating a signal corresponding to the phase angle of each j-th sample in the sequence to generate a sequence of phase angles;

generating a j-th phase vector signal for each j-th sample based on the sequence of phase angles, each j-th phase vector signal containing a representation of 2n terms centered symmetrically about each j-th sample's phase angle, wherein the first n terms represented in each j-th phase vector signal are generated by successively subtracting signals representing the previous n sample's phase angles from each j-th sample's phase angle, and wherein the second n terms represented in each j-th phase vector are generated by successively subtracting signals representing the subsequent n sample's phase angles from each j-th sample's phase angle;

generating a signal representing the sum of the 2n terms for each j-th phase vector to generate a j-th composite gain factor signal for each j-th sample in the sequence;

generating a signal representing each j-th composite gain factor over the 2n terms to generate a j-th average gain factor signal for each j-th sample in the sequence;

generating a signal representation the rotation of each j-th sample's defined input pair $(x_j, y_j)$ by 90° to generate a rotated input pair $(-y_j, x_j)$ signal; and generating a transformed input pair signal for each j-th sample in the sequence by generating a signal representing the product of each j-th average gain factor and each j-th sample's rotated input pair $(-y_j, x_j)$ to suppress interference characterized as having a frequency of change that is less than ½T, where T is the time required to receive the 2n terms symmetric about each j-th sample.

2. A method according to claim 1 wherein said step of generating a signal corresponding to the phase angle comprises the step of generating a signal representing the phase angle of each j-th sample from its corresponding input pair $(x_j, y_j)$.

3. A method according to claim 1 wherein said step of generating a signal corresponding to the phase angle comprises the step of retrieving the phase angle of each j-th sample from a memory that stores a plurality of phase angle values, wherein the phase angle of each j-th sample is based on its corresponding input pair $(x_j, y_j)$.

4. A method according to claim 1 wherein said step of generating a j-th phase vector signal further comprises the step of generating signals that represent a forcing of each of the generated 2n terms of each j-th phase vector into the range from $-\pi$ to $\pi$.

5. A method according to claim 1, wherein said step of generating the j-th phase vector signal for each j-th sample further comprises, prior to successively subtracting, the steps of generating a signal representing the product of each of the previous and subsequent n sample's phase angles and their corresponding amplitude and generating a signal representing the product of each j-th sample's phase angle and its corresponding amplitude; and further comprising the step of generating a signal representing the quotient of each j-th sample's rotated input pair $(-y_j, x_j)$ divided by each j-th sample's corresponding amplitude prior to said step of generating the transformed input pair.

6. For a sequence of received bandspread communication signal samples such that each sample is defined as a vector having a signal vector component and an interference vector component, a method of estimating a portion of the signal vector component that is normal to the interference vector component as an indication of the bandspread communication signal, comprising the steps of:

generating a signal corresponding to a phase angle of each sample based upon each sample's defined vector;

transforming the phase angle for each sample into a corresponding phase vector signal based on a symmetric sampling of phase angles from previous and subsequent received signal samples, each phase vector signal containing a representation of 2n terms centered symmetrically about each sample's phase angle, wherein the first n terms represented in each phase vector signal are generated by successively subtracting signals representing the previous n sample's phase angles from each sample's phase angle, and wherein the second n terms represented in each phase vector are generated by successively subtracting signals representing the subsequent n sample's phase angles from each sample's phase angle;

generating signals representing the sum of all terms of each corresponding phase vector to generate a corresponding phase gain signal for each sample;

generating a signal representing the average of each corresponding phase gain over the symmetric sampling to generate a corresponding average phase gain signal for each sample; and generating a signal that represents the product of each corresponding average phase gain and a vector normal to the corresponding sample's defined vector to estimate the signal vector component that is normal to the interference vector component for each sample, wherein said method is applicable whenever the phase of the interference vector components is characterized as having a frequency of change that is less than ½T, where T is the time required to receive the symmetric sampling.

7. For a radio receiving a sequence of bandspread communication signal samples whose information bits are spread by a factor of ten or more, wherein each j-th signal sample is defined by an input pair $(x_j, y_j)$ and a phase angle $\phi_j$, a method of estimating the communication signal when the signal samples contain interference, said method comprising the steps of:

generating a signal representing an averaged sum $$\frac{\left(\sum_{i=j-n}^{j+n} \phi_j - \phi_i\right)}{2n}$$

where the value of n is based on the radio's frequency of operation;

generating a rotated input pair $(-y_j, x_j)$ signal for each j-th signal sample; and generating a signal representing the product of each j-th signal sample's averaged sum and its corresponding rotated input signal pair to generate a transformed input signal pair for each sample as an estimate of the communication signal associated with each j-th sample.

8. An apparatus for suppressing interference from a sequence of bandspread communication signal samples in order to estimate a communication signal contained therein, wherein the signal samples have information bits that are spread by a factor of ten or more, and wherein each j-th signal sample is defined by an input pair $(x_j, y_j)$, said apparatus comprising:

first means for generating a signal corresponding to the phase angle for each j-th signal sample in the sequence to generate a sequence of phase angle signals;

second means operably coupled to said first means for generating a j-th phase vector signal for each j-th signal sample based on the sequence of phase angles, each j-th phase vector signal containing a representation of 2n terms centered symmetrically about each j-th signal sample's phase angle, wherein the first n terms represented in each j-th phase vector signal are generated by successively subtracting signals representing the previous n sample's phase angles from each j-th sample's phase angle, and wherein the second n terms represented in each j-th phase vector signal are generated by successively subtracting signals representing the subsequent n sample's phase angles from each j-th sample's phase angle;

third means operably coupled to said second means for generating a signal representing the sum of the 2n terms for each j-th phase vector to generate a j-th composite gain factor signal for each j-th sample in the sequence and for generating a signal representing the average of each j-th composite gain factor over the 2n terms to generate a j-th average gain factor signal for each j-th sample in the sequence;

fourth means for translating each j-th signal sample's defined input pair $(x_j, y_j)$ to generate a translated input pair $(-y_j, x_j)$ signal; and fifth means operably coupled to said fourth means for multiplying each j-th average gain factor signal by each j-th sample's translated input signal pair $(-y_j, x_j)$ to generate a transformed input signal pair for each j-th sample in the sequence to suppress interference characterized as having a frequency of change that is less than ½T, where T is the time required to receive the 2n terms symmetric about each j-th sample.

9. An apparatus as in claim 8 wherein said first means includes a read only memory for storing a plurality of phase angles based on possible values for the input pairs $(x_j, y_j)$.

10. An apparatus as in claim 8 wherein said second means is a serial-to-parallel converter comprising:

a sequence of (2n+1) shift registers having corresponding lengths of 1 to (2n+1) and connected in parallel for receiving each j-th phase angle; and a sequence of 2n adders connected in parallel, each one of a first sequence of n adders from said sequence of 2n adders further being serially connected to receive the output of a corresponding one of the first 1 to n shift registers from said sequence of (2n+1) shift registers, and each one of a second sequence of n adders from said sequence of 2n adders further being serially connected to receive the output of a corresponding one of the last n+2 to 2n shift registers from said sequence of (2n+1) shift registers, wherein said first and second sequence of n adders are non-overlapping sequences, and wherein each j-th phase angle passes unshifted through the (n+1) shift register to serve as a parallel input to each of said 2n adders.

11. In a phase filter for suppressing interference from a sequence of bandspread communication signal samples whose information bits are spread by a factor of ten or more, wherein each j-th signal sample is defined by an input pair $(x_j, y_j)$ signal, said phase filter comprising:

a coordinate transform network for determining magnitude and phase associated with each j-th signal sample from the sequence based on the input pair $(x_j, y_j)$ signal, whereby a corresponding sequence of sample phase $\phi_j$ signals are generated;

a serial-to-parallel converter for transforming each sample phase signal $\phi_j$ into a corresponding symmetric vector signal about j, each symmetric vector signal representing a vector having 2n sample phase differences $(\phi_j - \phi_{j-n}, \ldots, \phi_j - \phi_{j-1}, \phi_j - \phi_{j+1}, \ldots, \phi_j - \phi_{j+n})$, where n is a positive integer based on the phase filter's frequency of operation;

means for generating a signal representing the sum of all terms of each vector of sample phase differences to form a corresponding sum signal for each j-th sample and for averaging each corresponding sum signal over the 2n sample phase differences to form a corresponding averaged sum signal; and a filter applier for multiplying each input pair $(x_j, y_j)$ signal times the corresponding averaged sum signal for each j-th signal sample, wherein said phase filter suppresses interference characterized as having a frequency of change that is less than ½T, where T is the time required to receive 2n signal samples.

12. A phase filter as in claim 11 wherein said serial-to-parallel converter comprises:

a sequence of (2n+1) shift registers having corresponding lengths of 1 to (2n+1) and connected in parallel for receiving each sample phase $\phi_j$ signal; and a sequence of 2n adders connected in parallel, each one of a first sequence of n adders from said sequence of 2n adders further being serially connected to receive the output of a corresponding one of the first 1 to n shift registers from said sequence of (2n+1) shift registers, and each one of a second sequence of n adders from said sequence of 2n adders further being serially connected to receive the output of a corresponding one of the last n+2 to 2n shift registers from said sequence of (2n+1) shift registers, wherein said first and second sequence of n adders are non-overlapping sequences, and wherein each sample phase $\phi_j$ passes unshifted through the (n+1) shift register to serve as a parallel input to each of said 2n adders.

* * * * *